Figure 1:
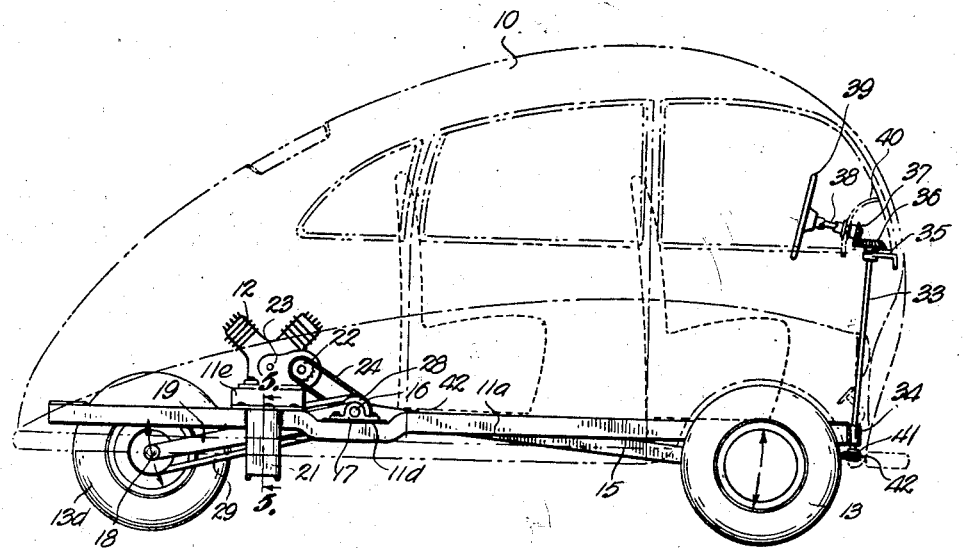

Jan. 20, 1948. K. DONOVAN 2,434,759
TRICYCLE VEHICLE
Filed Aug. 31, 1945 2 Sheets-Sheet 1

INVENTOR.
Karl Donovan
BY
ATTORNEY.

Jan. 20, 1948.   K. DONOVAN   2,434,759
TRICYCLE VEHICLE
Filed Aug. 31, 1945   2 Sheets-Sheet 2
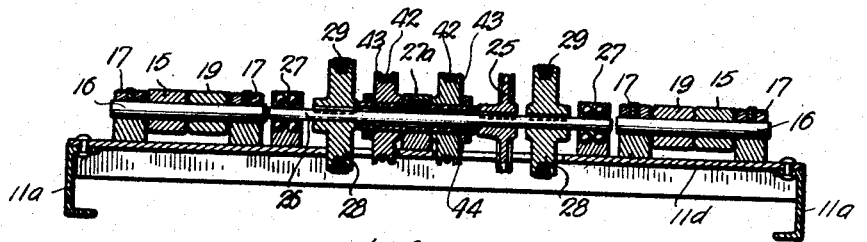
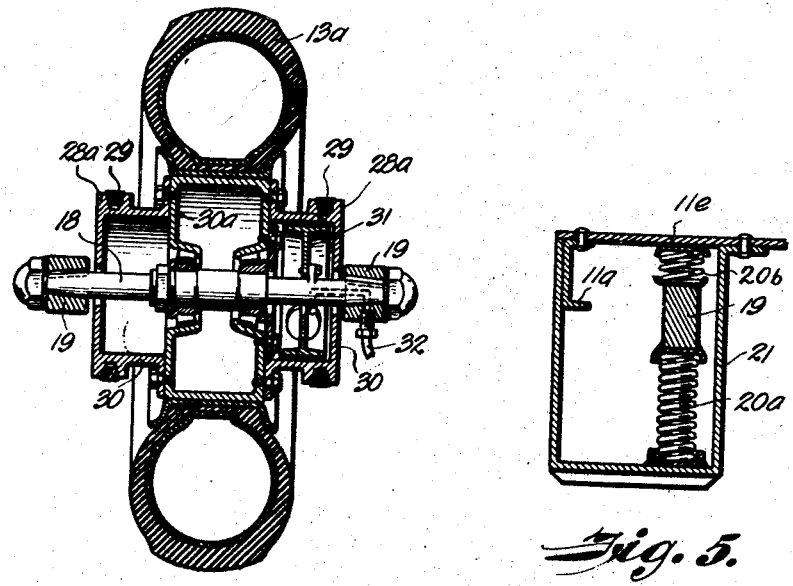
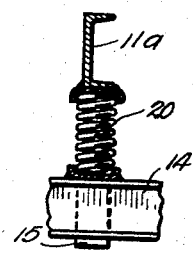
INVENTOR.
Karl Donovan
BY
ATTORNEY.

Patented Jan. 20, 1948

2,434,759

UNITED STATES PATENT OFFICE 2,434,759

TRICYCLE VEHICLE

Karl Donovan, Wichita, Kans.

Application August 31, 1945, Serial No. 613,878

1 Claim. (Cl. 280—124)

This invention relates to improvements in a tricycle vehicle and refers more particularly to a power driven utility car which has an improved type frame and wheel assembly and unique steering gear and propulsion mechanisms.

The design of the vehicle was conceived to meet the need for an intermediate type of utility transportation, utilizing aircraft techniques, and has been designated by the name "Euty" taken from the phrase or slogan "Economical Utility Transportation." This new type of vehicle is not intended to be classed as an automobile, motorcycle, jeep or scooter, but is what the name infers, a vehicle for economical utility transportation. The width between the front wheels is standard gauge or that of any of the standard cars, the interior of the body is full height and full width, so the drive is at the same height as in a conventional automobile seat. The vision from the driver's seat is better and the shape of the body has been given a streamlined appearance. It is in its mechanical design, however, that the "Euty" excels over other small cars and tricycle vehicles which have been made heretofore.

One important objection and fault of tricycle vehicles is the failure on the part of the designer to mount the wheels on the frame in a manner that they remain at all times rigidly in vertical planes. This is particularly important in steering and when turning the vehicle. This essential design feature is present in the "Euty" by providing front and rear supplemental frames for mounting the front and rear wheels, the supplemental frame pivoted at a common axis on the main frame.

A salient object, therefore, of the invention is to provide a frame and wheel assembly which mounts the front and rear wheels on supplemental frames pivoted on the main frame to a medial cross member to keep the wheels at all times in vertical planes.

Another object is to provide a steering mechanism which gives proper steering control and includes connections of fixed lengths from the steering column to a transmission or translating pivot on a medial cross member of the main frame and from this pivot to the tie rod of the wheels.

A further object is to provide drive connections of fixed lengths between the power unit and the rear axle, permitting the mounting of the power unit on the main frame with a direct drive from the power unit to a transmission element on a medial cross member of the main frame and a direct drive from the transmission element to the rear wheel, the interruption in the drive between the power unit and rear axle afforded by the transmission element also eliminating to a great extent road shock being transmitted to the power unit.

Another object is to interrupt the brake control mechanism by pivoting its connections centrally upon the same cross member of the main frame as the steering and propulsion mechanisms to maintain the cable or hydraulic tube lengths the same between the wheels and controls, regardless of road irregularities.

Other and further objects will appear from the decription.

Figure 2:
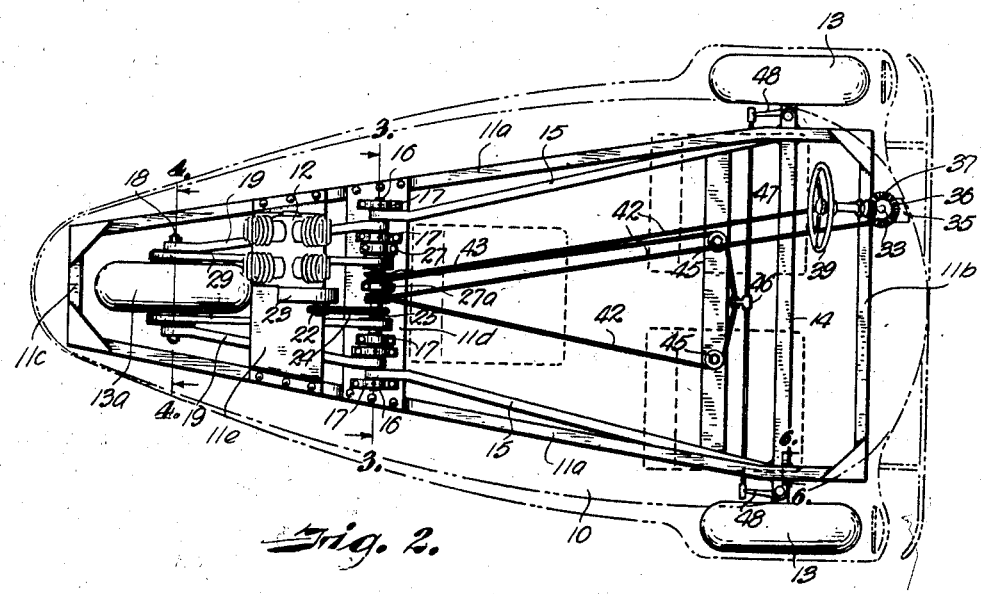

In the accompanying drawings which form a part of the instant specification and are to be read in conjunction therewith, and in which like reference numerals are used to indicate like parts in the various views, Fig. 1 is a side elevational view of a tricycle vehicle embodying the invention with the chassis or body in broken lines, Fig. 2 is a top plan view of the vehicle shown in Fig. 1, Fig. 3 is an enlarged section taken along the line 3—3 in Fig. 2 in the direction of the arrows, Fig. 4 is an enlarged section taken along the line 4—4 in Fig. 2 in the direction of the arrows, Fig. 5 is an enlarged section taken along the line 5—5 in Fig. 1 in the direction of the arrows, Fig. 6 is an enlarged section taken along the line 6—6 in Fig. 2 in the direction of the arrows.

Referring to the drawings and particularly to Figs. 1 and 2, at 10 is shown the body of the vehicle in broken lines. The body is mounted on a main frame comprising lateral longitudinal members 11a, a front cross member 11b, a rear cross member 11c, and a central or medial cross member 11d. The internal combustion engine which drives the vehicle is shown at 12, as a V-type four cylinder motor mounted on a base and supported on the cross member 11e of the main frame.

The manner in which the front and rear wheels are pivoted from the main frame on supplemental frames is not only unique in design but essential to the proper functioning of the vehicle. The front wheels 13 are mounted upon a front axle 14 which forms an integral part of the front supplemental frame. Longitudinal members 15 are rigidly attached at their front ends to the axle 14 and are pivoted at their rear ends upon shafts 16. These shafts are carried by supports 17 mounted upon the cross member 11d of the main frame. The rear wheel 13a rotates upon an axle 18 which is an integral part of the rear supplemental frame. Lateral longitudinal members of the rear supplemental frame comprise members 19 which carry the bearings of the axle 18 and are pivoted at their front end with the rear ends of members 15 on shafts 16. Thus, it will be seen that the front and rear axles 14 and 18 not only form parts of the front and rear supplemental frames but are free to move vertically upon a common pivot shaft 16 carried by cross member 11d of the main frame. These supplemental frames are structurally rigid and so pivoted as to prevent canting of the front and rear wheels from the vertical planes in which they must rotate to give safe and satisfactory operation of the vehicle. In other words, the front and rear supplemental frames are free to follow in a vartical direction irregularities in the road surface which the wheels may encounter, but are held rigidly against movement from their vertical planes regardless of such surface irregularities.

Between the front axle 14 and the lateral longitudinal members 11a of the main frame are cushioning devices, such as coil springs, shown at 20 in Fig. 6. Any suitable type of cushioning device may be used such as leaf springs, coil springs, or vibro-insulators in which rubber is welded to metal and put in shear to absorb shock. Spring housings 21 are attached at both sides of the main frame to its longitudinal members 11a and the engine supports 11e as shown in Fig. 5. Within the housings between suitable brackets are cushioning members such as coil springs 20a and 20b between which are resiliently supported laterals 19 of the rear supplemental frame. Thus, it will be seen that road shock transmitted from the front and rear axles is cushioned through springs 20, 20a and 20b. The particular type of spring or cushioning device used between the supplemental frames and main frame, as suggested, may be of any suitable type.

For propelling the vehicle an internal combustion engine 12 is mounted on the main frame, preferably behind the pivot support of the supplemental frames. The drive from the power unit is from a sprocket 22 driven from suitable transmission gearing within gear case 23. Power is transmitted from sprocket 22 through chain 24 to a sprocket 25 fixedly mounted on shaft 26. This latter shaft is carried by roller bearings 27 also mounted upon the medial cross member 11d and coaxial with pivot shafts 16. Shaft 26 is centrally supported between bearings 27 in a stationary sleeve carried by central pillar 27a hereinafter explained. Upon shaft 26 with sprocket 25 are fixedly mounted pulleys 28 over which run V-belts 29. Similar V-belt pulleys 28a are formed upon extensions 30 of the rear wheel hub 30a.

The clutch pedal, necessary connections between the pedal and clutch mechanism, as well as the transmission and gear shifting mechanism, have been purposely omitted since they are conventional and similar to those used on four wheel type vehicles. Also it is contemplated that the drive connections from the power unit to the rear wheel axle may be by a double propeller shaft with the necessary worm and pinion gears or a chain and sprocket drive instead of the V-belts. Whatever the driving connections may be, whether through V-belts, chains and sprockets, or through propeller shafts, an interrupting transmission element will be located upon the medial cross member 11d so the drive is from the power unit to the transmission element, and from the transmission element to the rear wheel axle. By this arrangement the length of the driving connections between the power unit and transmission element, and the transmission element and the rear wheel axle is fixed since the pivot of the power transmitting interrupter is coaxial with the pivots of the front and rear supplemental frames. The braking system may be either of mechanical type or a hydraulic system. In the drawings only the braking mechanism for the rear wheel is shown. Brake shoe 31 is located within the hub extension 30 and is actuated by hydraulic fluid supplied through tubing 32 shown in Fig. 4. In the event a mechanical system of braking is used, cables from the foot pedals would connect with arms pivoted on the cross member 11d and the braking force from such pivot would be transmitted to the brake drums on the front and rear wheels by separate cables. By interrupting the braking cables at a pivot located upon the medial cross member, difficulties arising from road irregularities which would vary the distances between the controls and the front and rear axles is likewise avoided. These precautions, while essential to mechanical braking systems where cables are used, are less vital in hydraulic systems where slight variations in the length of tubing can be compensated for by slight excess length in the tubing sections.

In the same manner and for the same reasons the steering gear cables are run over pulleys which are pivoted at the same pivot on medial cross member 11d. In the drawings steering of the vehicle is performed by a very simple arrangement. A steering column 33 is supported in a lower bearing 34 carried by the main frame and a bracket 35 attached to the body in front of the driver's seat. On top of the column is mounted a beveled gear 36 which meshes with a smaller beveled gear or pinion 37 fixedly attached to the shaft 38 upon which the steering wheel 39 is mounted. Shaft 38 is supported in a cowling diagrammatically shown at 40. At the lower end of steering column 33 is fixedly mounted a pulley 41 over which runs the steering cable 42. The cable passes over pulleys 43 which are rotatably mounted upon a stationary bearing sleeve 44 in which rotates shaft 26. The bearing sleeve 44 is centrally supported by the pillar or pedestal 27a and thus provides a pivot upon which the cable pulleys rotate. This pivot is coaxially located with respect to the transmission interrupter of the drive connections, as well as the pivots for the front and rear supplemental frames. After running over pulleys 43 the cables pass forwardly over pulleys 45 rotatably mounted upon cross member 15a of the front supplemental frame. The ends of the cable, or if the cable be endless, it is fastened at a clamp 46 to the tie rod 47. The ends of the tie rod are attached in the conventional manner to arms 48 which are pivoted upon the steering knuckles at the ends of the axle. While a simple cable and pulley has been shown as the steering mechanism, it is contemplated that any type may be used so long as the connections between the steering column and the pivot point on the main frame and the pivot point and connections to the supplemental frame and tie rod have a common pivot with the front supplemental frame thereby preventing variation in the lengths of these connections.

Thus it will be seen that there has been provided a tricycle vehicle designed to provide improved safety and riding qualities. This is accomplished by pivoting the front and rear supplemental frames which carry the front and rear axles to the main frame at an intermediate or medial point. Correspondingly the drive connection from the power unit to the rear axle is interrupted at the pivot point of the supplemental frames, as is the connection from the steering column to the front wheel tie rod. By pivoting the supplemental frames, the drive connections, steering connections and brake cables, if a mechanical steering mechanism is employed, upon a single axis on the main frame many of the difficulties, inconveniences and inadequacies of a tricycle vehicle are eliminated or rectified.

From the foregoing it will be seen that the vehicle is well adapted to attain the ends and objects herein set forth together with other advantages which are obvious and which are inherent to the design.

It will be understood that certain features and subcombinations are of utility and may be employed without reference to other features and subcombinations. This is contemplated by and is within the scope of the claim.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

In a frame and wheel assembly for a tricycle vehicle the combination with a main frame having lateral longitudinal members and front, medial and rear transverse members, a pair of supplemental frames, one in front and the other behind the medial transverse member, and both pivoted thereon, a pair of front wheels mounted upon an axle forming an integral part of the front supplemental frame, a single rear wheel mounted on an axle forming an integral part of the rear supplemental frame, cushioning means interposed between the main frame and supplemental frames.

KARL DONOVAN.

REFERENCES CITED

The following references are of record in the file of this patent:

UNITED STATES PATENTS

| Number | Name | Date |
|---|---|---|
| 1,803,055 | Causan | Apr. 28, 1931 |
| 2,167,096 | Van Den Stock | July 25, 1939 |
| 2,153,233 | Best | Apr. 4, 1939 |
| 2,153,271 | Paton | Apr. 4, 1939 |
| 2,243,124 | Rockola | May 27, 1941 |
| 2,331,976 | Hare | Oct. 19, 1943 |